W. C. BARKER.
CHAIN-PUMP BUCKETS.

No. 194,640. Patented Aug. 28, 1877.

WITNESSES

INVENTOR
Wm. C. Barker
by
ATTORNEYS

UNITED STATES PATENT OFFICE.

WILLIAM C. BARKER, OF HORSEHEADS, NEW YORK.

IMPROVEMENT IN CHAIN-PUMP BUCKETS.

Specification forming part of Letters Patent No. 194,640, dated August 28, 1877; application filed August 17, 1877.

*To all whom it may concern:*

Be it known that I, WILLIAM C. BARKER, of Horseheads, in the county of Chemung, and in the State of New York, have invented certain new and useful Improvements in Chain-Pump Buckets; and do hereby declare that the following is a full, clear, and exact description thereof, reference being had to the accompanying drawings and to the letters of reference marked thereon, making a part of this specification.

The nature of my invention consists in the construction and arrangement of a chain-pump bucket, as will be hereinafter more fully set forth.

In order to enable others skilled in the art to which my invention appertains to make and use the same, I will now proceed to describe its construction and operation, referring to the annexed drawings, in which—

Figure 1:
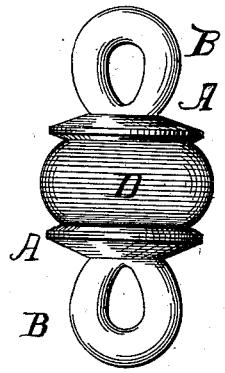
Figure 3:
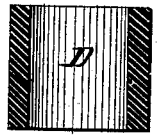
Figure 2:
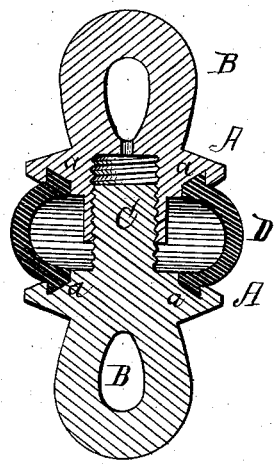

Figure 1 is a side view of my improved chain-pump bucket. Fig. 2 is a vertical section of the same, and Fig. 3 is a detailed section of a part thereof.

The body of my chain-pump bucket is composed of two circular disks or heads, A A, each provided with an eye, B, and the two heads connected by a central link, C.

These parts may be made separate, as shown, and connected by screw-threads, or the whole body may be made in one solid piece, without departing from the spirit of my invention.

In the inner faces of the two disks or plates A A are made circular grooves $a\,a$, concentric with the disks, said grooves forming beveled or inclined faces, as shown in Fig. 2.

D represents a piece of rubber tubing of suitable dimensions, which is inserted between the disks A A and sprung into the grooves $a\,a$ thereon, and forming the bucket proper.

Where the body A B C is made in one piece, the length of the rubber piece D should be such that when sprung into its place in the grooves $a\,a$ of the heads A it will bulge outward to properly fill and fit the tube of the chain-pump. When said body A B C is made in two parts screwed together, the rubber D may be expanded by simply screwing the parts more or less together, as required.

The employment of rubber tubing is of great advantage, as no matter how much expanded sidewise it retains all its elasticity, which is not the case where a solid piece of rubber is clamped between two plates, because the tighter it is clamped the more the rubber is solidified and rendered non-elastic, thus destroying the very quality which is so essential in the proper working of a chain-pump bucket.

I do not wish to be understood as claiming a rubber globe or sphere compressed between metal heads in a chain-pump bucket, as I am aware that such is not new.

Having thus fully described my invention, what I claim as new, and desire to secure by Letters Patent, is—

1. In a chain-pump bucket, a thin expansible section of rubber tube, held between two metallic heads, for the purpose set forth.

2. The combination of the body A B C, having concentric grooves $a\,a$ in the inner faces of the parts A A, and the piece of rubber tubing D secured between said parts A A, substantially as and for the purposes herein set forth.

In testimony that I claim the foregoing I have hereunto set my hand this 16th day of August, 1877.

W. C. BARKER.

Witnesses:
FRANK GALT,
J. C. SCHROEDER.